(12) United States Patent
Han et al.

(10) Patent No.: US 12,530,027 B2
(45) Date of Patent: Jan. 20, 2026

(54) CENTRAL MANAGEMENT SERVER, UNMANNED AIRCRAFT AND UNMANNED ROBOT FOR MONITORING MANAGEMENT TARGET AREA

(71) Applicants: Hyundai Motor Company, Seoul (KR); Kia Corporation, Seoul (KR)

(72) Inventors: Ji Min Han, Gyeonggi-do (KR); Jong Min Oh, Gyeonggi-do (KR); Ji A Lee, Seoul (KR); Ki Seok Sung, Gyeonggi-do (KR); Jong Kyu Choi, Gyeonggi-do (KR); Young Jun Byun, Seoul (KR); Kye Yoon Kim, Gyeonggi-do (KR); Jae Hoon Chung, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 246 days.

(21) Appl. No.: 17/989,766

(22) Filed: Nov. 18, 2022

(65) Prior Publication Data

US 2023/0229159 A1    Jul. 20, 2023

(30) Foreign Application Priority Data

Jan. 17, 2022    (KR) .................. 10-2022-0006722

(51) Int. Cl.
*G05D 1/00*    (2024.01)
(52) U.S. Cl.
CPC ......... *G05D 1/0027* (2013.01); *G05D 1/0287* (2013.01); *G05D 1/104* (2013.01)
(58) Field of Classification Search
CPC ..... G05D 1/104; G05D 1/0287; G05D 1/0027
See application file for complete search history.

(56) References Cited

U.S. PATENT DOCUMENTS 8,170,731 B2 *   5/2012   Martinez ................. G01S 17/04
                                                            701/519
8,973,671 B2 *   3/2015   Alsaif .................... A62C 27/00
                                                            180/9.1
(Continued)

FOREIGN PATENT DOCUMENTS

CN    106054922 A      10/2016
CN    110428111 A  *   11/2019    ........... G05D 1/0212
(Continued)

OTHER PUBLICATIONS

Machine translation of CN_110428111_A (Year: 2019).*
(Continued)

*Primary Examiner* — Kenneth M Dunne
(74) *Attorney, Agent, or Firm* — Fox Rothschild LLP (57) ABSTRACT

A central management server according to an embodiment of the present disclosure includes: a selection module for selecting an unmanned aircraft and an unmanned robot to monitor a management target area; and a control module for transmitting a monitoring execution command to the selected unmanned aircraft and the unmanned robot, wherein, according to the monitoring execution command, the unmanned robot moves along a preset ground guard route and monitors the management target area on the ground, and the unmanned aircraft flies along a preset air guard route and monitors the management target area from above. When it may be determined that an event has occurred during monitoring, at least one of the unmanned aircraft and the unmanned robot may be configured to transmit event information including location information of a point at which the event has occurred to the control module.

21 Claims, 4 Drawing Sheets

(56) References Cited

U.S. PATENT DOCUMENTS

| | | | |
|---|---|---|---|
| 11,410,562 B1* | 8/2022 | Mishra | B64U 80/86 |
| 2015/0336668 A1* | 11/2015 | Pasko | G05D 1/0005 |
| | | | 701/2 |
| 2015/0336671 A1* | 11/2015 | Winn | G05D 1/0202 |
| | | | 701/3 |
| 2015/0367513 A1* | 12/2015 | Gettings | G05D 1/0212 |
| | | | 700/248 |
| 2016/0023699 A1* | 1/2016 | Saunders | B25J 9/1612 |
| | | | 60/428 |
| 2016/0111006 A1* | 4/2016 | Srivastava | G08G 1/00 |
| | | | 701/3 |
| 2018/0147429 A1* | 5/2018 | Won | B64U 30/293 |
| 2019/0248014 A1* | 8/2019 | Deyle | B25J 13/085 |
| 2019/0382111 A1* | 12/2019 | Schwartz | H02G 1/02 |
| 2020/0130828 A1* | 4/2020 | Pandit | G08G 5/0043 |
| 2020/0175767 A1* | 6/2020 | Stivi | G08B 25/10 |
| 2021/0155344 A1 | 5/2021 | Mura Yañez | |
| 2021/0299875 A1 | 9/2021 | Iyer et al. | |
| 2023/0027071 A1* | 1/2023 | Shmueli | B60W 60/0025 |
| 2023/0064401 A1* | 3/2023 | Heinzle | G01S 17/86 |
| 2024/0160229 A1* | 5/2024 | Rana | G05D 1/693 |

FOREIGN PATENT DOCUMENTS

| | | |
|---|---|---|
| KR | 10-2015-0033241 A | 4/2015 |
| KR | 10-2016-0104953 A | 9/2016 |
| KR | 10-2017-0138225 A | 12/2017 |
| KR | 10-1913391 B1 | 10/2018 |
| KR | 10-2019-0048059 A | 5/2019 |
| KR | 10-2150342 B1 | 9/2020 |
| KR | 10-2179689 B1 | 11/2020 |

OTHER PUBLICATIONS

Wu et al, "Cooperative Path Planning of UAVs & UGVs for a Persistent Surveillance Task in Urban Environments", Mar. 2021 (Year: 2021).*

Stump et al, "Multi-Robot Persistent Surveillance Planning as a Vehicle Routing Problem".2011 (Year: 2011).*

Youtube video, MARS Laboratory, OPG—Ontario Tech Boston Dynamics Spot Update; 2021 (Year: 2021).*

Viguria et al, "Distributed Service-Based Cooperation in Aerial/Ground Robot Teams Applied to Fire Detection and Extinguishing Missions", 2010 (Year: 2010).*

Rubio et al, "A review of mobile robots: Concepts, methods, theoretical framework, and applications", 2019 (Year: 2019).*

Merino et al, "A cooperative perception system for multiple UAVs: Application to automatic detection of forest fires", 2006 (Year: 2006).*

Choi et al. "Study on the application methods of the power induction screening factor in urban and rural areas using the building density distribution", including its English abstract (2013).

\* cited by examiner

CENTRAL MANAGEMENT SERVER, UNMANNED AIRCRAFT AND UNMANNED ROBOT FOR MONITORING MANAGEMENT TARGET AREA

CROSS-REFERENCE TO RELATED APPLICATION(S)

This application claims under 35 U.S.C. § 119(a) the benefit of priority to Korean Patent Application No. 10-2022-0006722 filed on Jan. 17, 2022, in the Korean Intellectual Property Office, the disclosure of which is incorporated herein by reference in its entirety.

BACKGROUND

1. Field

The present disclosure relates to a central management server, an unmanned aircraft, and an unmanned robot for monitoring a management target area, and combinations thereof.

2. Background Description

Recently, research on conducting rescue activities by imaging disaster areas using a drone, and monitoring image display screens, is being actively conducted.

However, in the case of the conventional method described above, an operator must manually control the drone, and it cannot be used in a city center, a no-fly zone, or the like, with many wires and many obstacles.

In addition, when a resolution of the image captured by the drone may be lowered, it may be difficult to accurately identify the disaster area in detail, and since the operator needs to request a rescue by viewing the image captured by the drone, there may be a problem that it may be difficult to quickly respond within a critical period after a disaster has occurred.

SUMMARY

An exemplary embodiment of the present disclosure may be to provide a central management server, an unmanned robot, an unmanned aircraft, or a combination thereof with which three-dimensional monitoring of disasters such as fires, or the like, occurring in a management target area, may be performed. When an event such as a fire, an earthquake, or the like, occurs, it may be possible to quickly monitor and respond to the fire or other event within a critical period, so that the area can be evacuated quickly.

According to an exemplary embodiment of the present disclosure, in a central management server for monitoring a management target area in connection with an unmanned aircraft and an unmanned robot, the central management server may include: a selection module configured for selecting an unmanned aircraft and an unmanned robot to monitor a management target area; and a control module configured for transmitting a monitoring execution command to the selected unmanned aircraft and the unmanned robot, wherein, according to the monitoring execution command, the unmanned robot is configured to move along a preset ground guard route and monitor the management target area on the ground, and the unmanned aircraft is configured to fly along a preset air guard route and monitors the management target area from above and wherein, when it may be determined that an event has occurred during monitoring, at least one of the unmanned aircraft and the unmanned robot is configured to transmit event information including location information of a point at which the event has occurred to the control module. Exemplary embodiments may be configured such that the unmanned robot and the unmanned aircraft are configured to automatically and under self-guidance to move along the present ground guard route without a real time control by a user.

According to an exemplary embodiment of the present disclosure, in an unmanned robot for monitoring a management target area in connection with a central management server and an unmanned aircraft, the unmanned robot may include: a communications module configured for receiving a monitoring execution command from the central management server; a task execution module configured, when the monitoring execution command may be received, for moving along a preset ground guard route of the management target area and monitoring the management target area on the ground; and a control module configured, when it may be determined that an event has occurred during monitoring, for transmitting event information including location information of a point at which an event has occurred to the central management server. In an exemplary embodiment of the unmanned robot used in conjunction with an unmanned aircraft the unmanned aircraft may be configured to fly along a preset air guard route, monitor the management target area from above, and when it may be determined that an event has occurred during monitoring, transmit event information including location information of a point at which the event has occurred to the central management server.

According to an exemplary embodiment of the present disclosure, in an unmanned aircraft for monitoring a management target area in connection with a central management server and an unmanned robot, the unmanned aircraft may include: a communications module configured for receiving a monitoring execution command from the central management server; a task execution module configured, when the monitoring execution command may be received, for flying along a preset air guard route and monitoring the management target area from above; and a control module configured, when it may be determined that an event has occurred during monitoring, for transmitting event information including location information of a point at which an event has occurred to the central management server. In an exemplary embodiment in which the unmanned aircraft is used in combination with an unmanned robot, the unmanned robot may be configured to move along a preset ground guard route of the management target area and monitor the management target area on the ground, and when it may be determined that an event has occurred during monitoring, to transmit event information including location information of a point at which an event has occurred to the central management server.

BRIEF DESCRIPTION OF DRAWINGS

The above and other embodiments, features, and advantages of the present disclosure will be more clearly understood from the following detailed description, taken in conjunction with the accompanying lead-outs, in which.

DETAILED DESCRIPTION

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components or combinations thereof.

Although an exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, embodiments in the present disclosure will be described hereinafter with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the same reference numerals will be used throughout to designate the same or like elements, and the shapes and dimensions of elements may be exaggerated for clarity.

Figure 1:
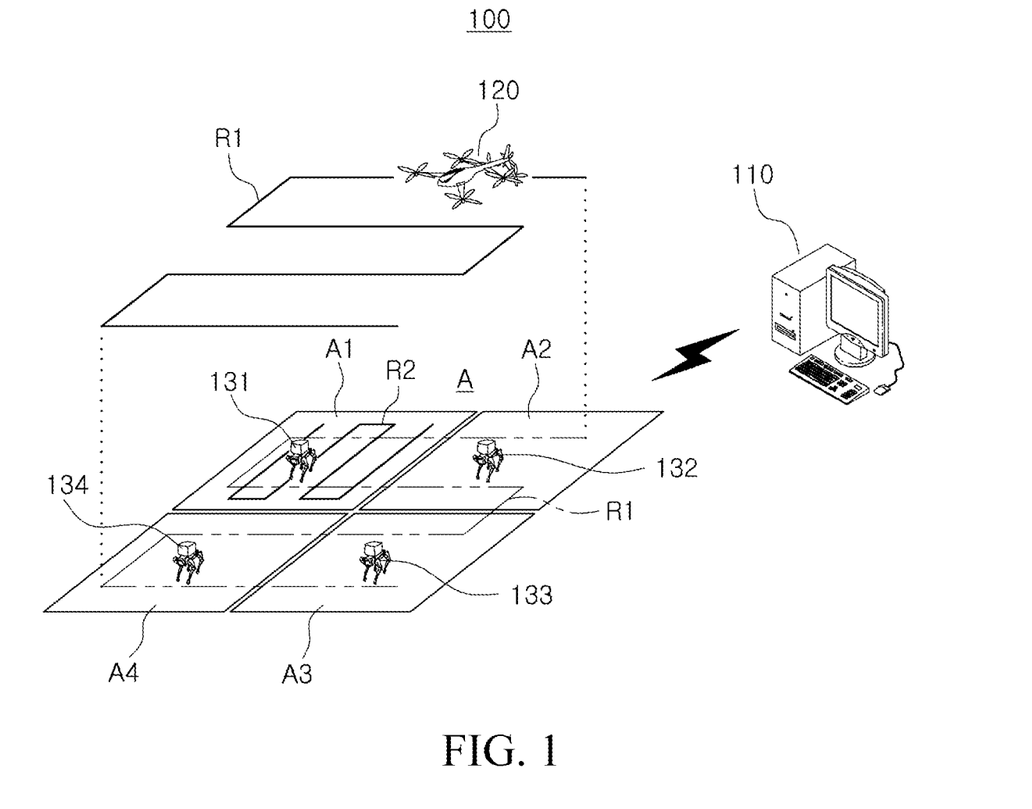
FIG. 1 is a diagram illustrating a monitoring system for monitoring a management target area according to an exemplary embodiment of the present disclosure.

FIG. 1 is a diagram illustrating a monitoring system 100 for monitoring a management target area according to an embodiment of the present disclosure. Meanwhile, FIG. 2 is an internal block diagram of each of a central management server 110, an unmanned aircraft 120, and an unmanned robot 130 of the monitoring system 100 according to an embodiment of the present disclosure.

Hereinafter, an operation of the monitoring system 100 including the central control server 110, the unmanned aircraft 120, and the unmanned robot 130 of the monitoring system 100 will be described with reference to FIGS. 1 and 2.

Figure 2:
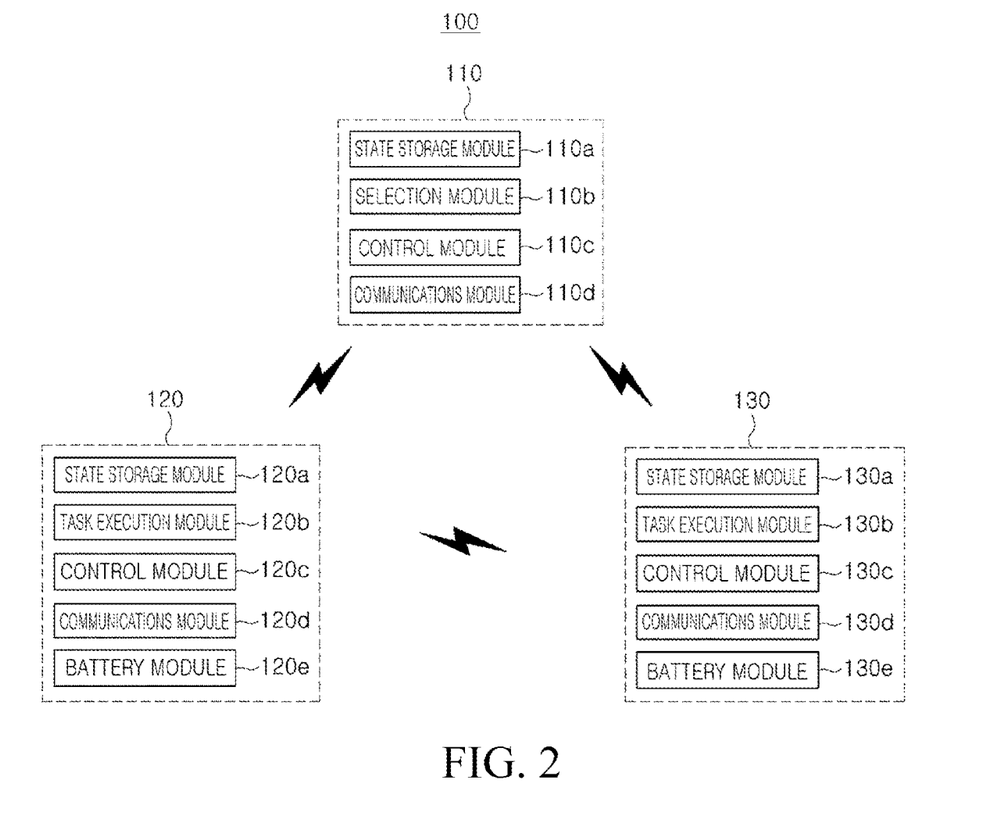
FIG. 2 is an internal block diagram of each of a central management server, an unmanned aircraft, and an unmanned robot of the monitoring system according to an exemplary embodiment of the present disclosure.

First, as illustrated in FIGS. 1 and 2, the monitoring system 100 may include a central management server 110, an unmanned aircraft 120, and an unmanned robot 130.

To facilitate understanding of the present disclosure, as illustrated in FIG. 1, a management target area A may be divided into a plurality of divided areas A1 to A4, and each of the divided plurality of divided areas A1 to A4 may be monitored by the unmanned robots 131 to 134, and the management target area A may be monitored by the unmanned aircraft 120 above the management target area A.

For example, referring to the divided area A1, the unmanned robot 131 may move along a preset ground guard route R2 according to a monitoring execution command and monitor the divided area A1 on the ground. In the remaining divided areas A2 to A4, each of the unmanned robots 132 to 134 may operate in the same manner but for their respective preset ground guard routes being the respective divided areas.

In addition, the unmanned aircraft 120 may fly along a preset air guard route R1 and monitor the management target area A from above. It may be apparent to those skilled in the art that the above-described routes R1 and R2 may have various shapes such as a lattice shape, a zigzag shape, and a spiral shape.

Meanwhile, throughout this specification, the meaning of monitoring includes capturing an image of a fire scene in the management target area A, or measuring heat, a concentration of fine dust, a concentration of harmful gas, or intensity of an earthquake, or any combination thereof. As used herein, fine may be a predefined small size for dust that is considered harmful at given concentrations in the air. A person of skill in the art of air quality controls may determine a size that is considered fine in order to monitor for harmful conditions caused a certain quantities of that size dust in the air. As used herein, a harmful gas may be any gas that is undesirable in the air or environment. A person of skill in the art of air quality controls may determine which gases may be considered harmful gases.

The central management server 110 may include a state storage module 110a, a selection module 110b, a control module 110c, and a communications module 110d.

The status storage module 110a may be configured to store state information of the unmanned aircraft 120 transmitted from the unmanned aircraft 120 in real time including a task execution status (e.g., waiting, executing task, type of task being executed, returning after task completion, charging), current location information, remaining battery capacity, whether communication status may be error or not, monitoring results (e.g., captured image, measured heat, measured fine dust concentration, measured harmful gas concentration, and photographed person's face), and state information of the unmanned robot 130 transmitted from the unmanned robot 130 in real time including a task execution status (e.g., waiting, executing task, type of task being executed, returning after task completion, charging), current location information, remaining battery capacity, whether communication status may be error or not, monitoring results (e.g., measured intensity of an earthquake, captured image, measured heat, measured fine dust concentration, measured harmful gas concentration, and photographed person's face).

Here, the task means a task executed by the unmanned aircraft 120 and/or the unmanned robot 130, and in the case of a task by the monitoring execution command, the unmanned aircraft 120 and/or the unmanned robot 130 may be monitored while flying or moving along a set route, in the case of task by the evacuation guidance command, the unmanned guidance robot may be configured to notify occurrence of a fire and provide directions to an evacuation site at the same, and in the case of a task by the firefighting command, the unmanned firefighting robot may be configured to notify occurrence of a fire and extinguishes the fire at the same time.

The selection module 110b may be configured to select the unmanned aircraft 120 and the unmanned robot 130 to monitor the management target area.

Specifically, an unmanned aircraft and an unmanned robot may be selected based on a combination of topographical characteristics, area, and attributes of the management target area, and may be selected from a plurality of unmanned aircraft and unmanned robots.

Here, the topographical characteristic refers to the geographical ruggedness of the management target area. For example, when an area of the management target area includes unpaved roads, the area of the management target area is a size of a management target area, and an attribute thereof refers to the case in which the management target area may be a no-fly zone.

According to an embodiment of the present disclosure, when the area of the management target area may be equal to or greater than a preset first reference area, the selection module 110b may be configured to select an unmanned aircraft having a first size. Alternatively, when the area of the management target area may be less than a first reference area, the selection module 110b may select an unmanned aircraft having a second size, the second size smaller than the first size. The first size, the second size, and the first reference area of the unmanned aircraft described above may be provided to help the understanding of the disclosure, and specific values may be appropriately set and used according to the needs of those skilled in the art.

In addition, according to an exemplary embodiment of the present disclosure, when the management target area includes an unpaved road, the selection module 110b may be configured to select an unmanned robot that moves using quadrels or quadrupeds. Alternatively, the selection module 110b may be configured to select an unmanned robot that moves using wheels when the management target area includes a pavement or paved road.

Alternatively, when the sky above the management target area may be a no-fly zone, the selection module 110b may select only the unmanned robot. For example, in FIG. 1, if some area A3 of the management target area A may be a no-fly zone, only the unmanned robot 133 may be selected for the area A3, and in this case, an air guard route R1 may be set to avoid the area A3.

It should be noted that the specific examples such as the area mentioned above for selecting the unmanned aircraft or the unmanned robot, the unpaved road or paved road, the no-fly zone, and the like, may be provided to aid understanding of the present disclosure, and the present disclosure is not limited to these specific examples.

In addition, the selection module 110b may be configured to adjust a size of a divided area to be monitored by each of the unmanned robots 131 to 134 among the plurality of divided areas A1 to A4 according to the remaining battery capacity of the unmanned robots 131 to 134.

For example, when a total area of the management target area (A) may be 10000 m$^2$, a remaining battery capacity of the unmanned robot 131 may be 60%, a remaining battery capacity of the unmanned robot 132 may be 40%, a remaining battery capacity of the unmanned robot 133 may be 80%, and a remaining battery capacity of the unmanned robot 134 may be 20%, the sizes of the divided areas A1 to A4 to be monitored by each of the unmanned robot 131 to the unmanned robot 134 may be adjusted proportional to the respective battery life as shown in Equation 1 below.

$$A1 = 10000 \times \frac{60}{(60+40+80+20)} = 3000 \qquad \text{[Equation 1]}$$
$$A2 = 10000 \times \frac{40}{(60+40+80+20)} = 2000$$
$$A3 = 10000 \times \frac{80}{(60+40+80+20)} = 4000$$
$$A4 = 10000 \times \frac{20}{(60+40+80+20)} = 1000$$

Meanwhile, the control module 110c may be configured to transmit a monitoring execution command to the unmanned aircraft 120 and the unmanned robot 130 selected in the above-described selection module 110b.

In addition, when event information including location information of a point at which an event occurs from the unmanned aircraft 120 or the unmanned robot 130 may be received, the control module 110c may be configured to execute an action according to the event information.

According to an embodiment of the present disclosure, if the event may be an earthquake event for an earthquake, the control module 110c may be configured to transmit an evacuation guidance command including location information of an evacuation site to an unmanned guidance robot, thereby causing the unmanned guidance robot to notify occurrence of an earthquake and at the same time, providing directions to the evacuation site.

According to an embodiment of the present disclosure, if the event may be a fire event, the control module 110c may be configured to transmit an evacuation guidance command including location information of an evacuation site to an unmanned guide robot, thereby causing the unmanned guidance robot to notify occurrence of the occurrence of a fire and at the same time, provide directions to the evacuation site, or transmit a firefighting command for extinguishing a fire to an unmanned firefighting robot, thereby causing the unmanned firefighting robot to notify occurrence of a fire and at the same time, extinguishing the fire.

According to an embodiment of the present disclosure, if the event may be a quality event for air quality, the control module 110c may be configured to transmit an evacuation guidance command including location information of an evacuation site to the unmanned guidance robot, thereby notifying air quality deterioration and at the same time, providing directions to the evacuation site.

According to an embodiment of the present disclosure, if the event may be a crime prevention event, a missing person event, or an event for an emergency situation, the control module 110c may be configured to transmit event information including a captured image and location information of an imaging point to a server of a related institution.

The communications module 110d may include a wireless interface for transmitting and receiving various data to and from the unmanned aircraft 120 and the unmanned robot 130.

The unmanned aircraft 120 may include a state storage module 120a, a task execution module 120b, a control module 120c, a communications module 120d, and a battery module 120e.

The above-described unmanned aircraft 120 may be a moving object autonomously traveling according to a preset flight route using a driving device including a propeller, or the like.

Specifically, the state storage module 120a may be configured to store state information of the unmanned aircraft 120 transmitted from the unmanned aircraft 120 in real time including a task execution status (e.g., waiting, executing task, type of task being executed, returning after task completion, charging), current location information, remaining battery capacity, whether communication status may be error or not, monitoring results (e.g., captured image, measured heat, measured fine dust concentration, measured harmful gas concentration, and photographed person's face), and state information of the unmanned robot 130 transmitted from the unmanned robot 130 in real time including a task execution status (e.g., waiting, executing task, type of task being executed, returning after task completion, charging), current location information, remaining battery capacity, whether communication status may be error or not, monitoring results (e.g., measured intensity of an earthquake, captured image, measured heat, measured fine dust concentration, measured harmful gas concentration, and photographed person's face). The stored state information of the unmanned aircraft 120 may be transmitted to the central management server 110 in real time.

When a monitoring execution command may be received from the central management server 110, the task execution module 120b may be configured to move the unmanned aircraft along a preset air route R1 and monitor the management target area A from above.

In addition, the task execution module 120b may be configured to capture a captured image of a fire site using a camera, measure heat generated from a fire site using a thermal sensor, measure a concentration of fine dust using an air quality sensor, measure a concentration of harmful gas generated in the management target area using a gas sensor, or any combination thereof. To this end, the task execution module 120b may include at least one of a camera, a thermal sensor, an air quality sensor, and a gas sensor.

In addition, the task execution module 120b may further receive event information from the unmanned robot 130, and accordingly, monitor a point at which the event has occurred from above, and transmit monitoring results to the central management server 110. This may be because it may be more effective to three-dimensionally monitor the point at which the event has occurred from the ground and above.

When it may be determined that an event has occurred during monitoring, the control module 120c may be configured to transmit event information including location information of a point at which the event has occurred to the central management server 110.

Specifically, if the event may be a fire event for a fire, the control module 120c may be configured to determine whether the event has occurred based on any one of an image captured by a camera and heat measured by a thermal sensor. When it may be determined that an event has occurred, the control module 120c may transmit event information including any one of a captured image and measured heat and location information of an imaging point to the central management server 110.

In addition, if the event may be a air quality event for air quality, the control module 120c may determine that the event has occurred when a measured concentration of fine dust or a concentration of harmful gas may be greater than or equal to a preset value for each thereof. When it may be determined that an event has occurred, the control module 120c may be configured to transmit event information including the measured concentration of fine dust or the measured concentration of harmful gas and location information of the measurement point to the central management server 110.

In addition, if the event may be an event for an emergency situation, the control module 120c may be configured to determine that the event has occurred when the number of people imaged using a camera may be greater than or equal to a preset multiple of a normal number of people imaged based on the same location, or a moving speed of the people photographed may be greater than or equal to a preset multiple of a normal moving speed imaged based on the same location, or when a movement route of the imaged people may be different from a normal movement route imaged based on the same location, it may be determined that the event has occurred. When it may be determined that an event has occurred, the control module 120c may be configured to transmit event information including the captured image and location information of the imaging point to the central management server 110.

Meanwhile, according to an embodiment of the present disclosure, the control module 120c may be configured to perform the role of the control module 110c of the management server 110 described above instead. This case may be applied when communication with the control server 110 may be impossible.

The communications module 120d may include a wireless interface for transmitting and receiving various data with the central management server 120 and the unmanned cargo aircraft 120.

The battery module 120e may be a module for supplying power to the above-described task execution module 120b, and various types of batteries such as a lithium ion battery, an all-solid-state battery, and the like may be used.

The unmanned robot 130 may include a state storage module 130a, a task execution module 130b, a control module 130c, a communications module 130d, and a battery module 130e. Each of the unmanned robots 131 to 134 illustrated in FIG. 1 may have the same module as the unmanned robot 120 illustrated in FIG. 2.

The above-described unmanned robot 130 may be a moving object autonomously traveling on the ground according to a preset route using a driving device including wheels or quadruped limbs.

The status storage module 130a may be configured to store state information including a task execution status (e.g., waiting, executing task, type of task being executed, returning after task completion, charging), current location information, remaining battery capacity, whether communication status may be error or not, monitoring results (e.g., measured earthquake intensity, captured image, measured heat, measured fine dust concentration, measured harmful gas concentration, and an imaged person's face). The stored state information of the unmanned robot 130 may be transmitted to the central management server 110 and the unmanned aircraft 120 in real time.

When a monitoring execution command may be received from the central management server 110, the task execution module 130b may be configured to move the unmanned robot along a preset ground guard route and monitor the management target area on the ground. In addition, the task execution module 130b may be configured to measure the intensity of an earthquake using an earthquake sensor, photograph a fire site using a camera, measure heat generated from a fire site using a thermal sensor, measure a concentration of fine dust using an air quality sensor, measure a concentration of harmful gas generated in the management target area using a gas sensor, photograph a person's face in the management target area, or any combination thereof. To this end, the task execution module may include at least one of an earthquake sensor, a camera, a thermal sensor, an air quality sensor, or a gas sensor.

In addition, the task execution module 130b may further be configured to receive event information from the unmanned aircraft 120, and accordingly, monitor a point at which the event has occurred on the ground and transmit the monitoring result to the central management server 110. This may be because it may be more effective to three-dimensionally monitor the point at which the event has occurred from the ground and from above.

When it may be determined that an event has occurred during monitoring, the control module 130c may be configured to transmit event information including location information of a point at which the event has occurred to the central management server 110.

Specifically, if the event may be an earthquake event for an earthquake, the control module 130c may be configured to determine that the event has occurred when the measured earthquake intensity may be greater than or equal to a preset earthquake intensity. When it may be determined that an event has occurred, the control module 130c may be configured to transmit event information including the measured intensity of the earthquake and location information of a measurement point to the central management server 110.

In addition, the event may be a crime event for crime prevention or for a missing person, the control module 130c may be configured to determine that an event has occurred when a face of a person photographed using a camera may be different from a Face ID of a person permitted to access the management target area or may be the same as the Face ID of the missing person. If it may be determined that an event has occurred, the control module 130c may be configured to transmit event information including the captured image and location information of an imaging point to the central management server 110.

The determination of whether an event occurs in case of fire, air quality, and emergency situation may be the same as described in the above-described unmanned aircraft 120.

The communications module 130d may include a wireless interface for transmitting and receiving various data with the central management server 110 and the unmanned aircraft 120.

The battery module 130e may be a module configured for supplying power to the above-described task execution module 130b, and various types of batteries such as a lithium ion battery, an all-solid-state battery, and the like may be used.

As described above, according to an embodiment of the present disclosure, by linking an unmanned aircraft and an unmanned robot, the management target area may be monitored using the unmanned robot on the ground, and by monitoring the management target area using the unmanned aircraft from above, three-dimensional monitoring of disasters such as a fire, or the like occurring in the management target area may be performed.

In addition, by an embodiment of the present disclosure, when an event such as a fire, an earthquake, or the like, occurs, an unmanned firefighting robot, an unmanned guide robot, and the like, may be introduced at an early stage to quickly extinguish the fire within a critical period, thereby helping people to evacuate quickly.

Figure 3:
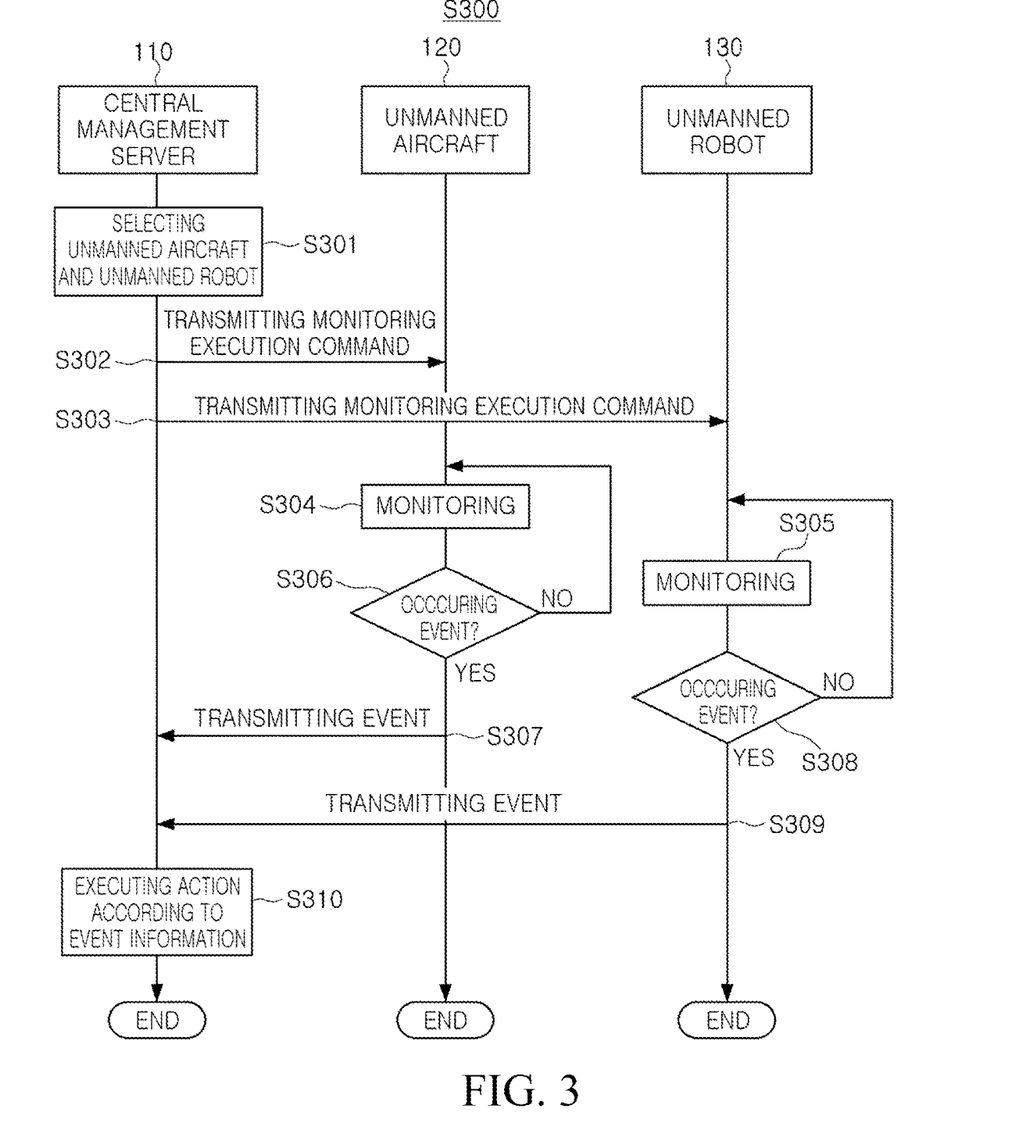
FIG. 3 is a flowchart illustrating a method for monitoring a management target area according to an exemplary embodiment of the present disclosure.

FIG. 3 is a flowchart illustrating a method for monitoring a management target area according to an embodiment of the present disclosure.

Hereinafter, a method (S300) for monitoring a management target area according to an embodiment of the present disclosure will be described with reference to FIGS. 1 to 3. However, descriptions overlapping those of FIGS. 1 to 2 will be omitted for the sake of simplification of the disclosure.

First, the central management server 110 may select an unmanned aircraft 120 and an unmanned robot 130 to monitor a management target area (S301).

Specifically, as described above, the unmanned aircraft and the unmanned robot may be selected based on a combination of topographical characteristics, area, and attributes of the management target area.

In addition, as illustrated in FIG. 1, when there may be a plurality of unmanned robots 130 in a management target area A comprised of a plurality of divided areas A1 to A4, as described above, the central management server 110 may adjust a size of the divided area to be monitored by respective unmanned robots 131 to 134 among the plurality of divided areas A1 to A4 according to remaining battery capacity of each of the unmanned robots 131 to 134.

Next, the central management server 110 may transmit a monitoring execution command to the unmanned aircraft 120 and the unmanned robot 130 (S302, S303).

Thereafter, each of the unmanned aircraft 120 and the unmanned robot 130 may monitor the management target area (S304, S305).

Specifically, the unmanned aerial vehicle 120 may fly along a preset air guard route and monitor the management target area from above (S304). Similarly, the unmanned robot 130 may move along a preset ground guard route and monitor the management target area on the ground (S305).

Thereafter, the unmanned aircraft 120 may determine whether an event has occurred during monitoring (S306), and when it may be determined that the event has occurred, event information including location information of a point at which the event has occurred may be transmitted to the central management server 110 (S307).

Similarly, the unmanned robot 130 may determine whether an event has occurred during monitoring (S308), and when it may be determined that the event has occurred, event information including location information of a point at which the event has occurred may be transmitted to the central management server 110 (S309).

The above-described event may include at least one of an event for an earthquake, an event for a fire, an event for air quality, an event for crime prevention, an event for a missing person, or an event for an emergency situation.

According to an embodiment of the present disclosure, if the event may be a fire event, the unmanned aircraft 120 and the unmanned robot 130 may determine an event has occurred based on any one of an image captured by a camera and heat measured by a thermal sensor. When it may be determined that an event has occurred, as described above, the unmanned aircraft 120 and the unmanned robot 130 may transmit event information including any one of the captured image and the measured heat and the location information of the imaging point to the central management server 110.

According to an embodiment of the present disclosure, if the event may be a quality event for air quality, the unmanned aircraft 120 and the unmanned robot 130 may determine that an event has occurred when the measured concentration of fine dust of the concentration of harmful gas is greater than or equal to a preset value for each thereof. When it may be determined that an event has occurred, as described above, the unmanned aircraft 120 and the unmanned robot 130 may transmit event information including the measured concentration of fine dust or the measured concentration of harmful gas and location information of the measurement point to the central management server 110.

According to an embodiment of the present disclosure, if the event may be an event for an emergency situation, when the number of people captured imaged using a camera may be greater than or equal to a preset multiple number of a normal number of people captured imaged based on the same location, or when a moving speed of captured imaged people may be greater than or equal to a preset multiple number of a normal moving speed imaged based on the same location or when a movement route of the imaged people is different from a normal movement route imaged based on the same location, the unmanned aircraft 120 and the unmanned robot 130 may determine that an event has occurred. As described above, when it is determined that an event has occurred, the unmanned aircraft 120 and the unmanned robot 130 may transmit event information including a captured image and location information of an imaging point to the central management server 110.

According to an embodiment of the present disclosure, if the event may be an earthquake event for an earthquake, the unmanned robot 130 may determine that the event has occurred when measured earthquake intensity is greater than or equal to a preset earthquake intensity. As described above, when it may be determined that an event has occurred, the unmanned robot 130 may transmit event information including the measured earthquake intensity and location information of a measurement point to the central management server 110.

According to an embodiment of the present disclosure, if the event may be a crime event for crime prevention or an event for a missing person, the unmanned robot 130 that an event has occurred when a face of a person imaged using a camera is different from a face ID of a person permitted to enter the management target area or is the same as a face ID of a missing person. As described above, when it may be determined that an event has occurred, the unmanned robot 130 may transmit event information including the captured image and location information of an imaging point to the central management server 110.

Finally, the central management server 110, when event information including location information of a point at which an event has occurred may be received from the unmanned aircraft 120 and/or the unmanned robot 130, may execute an action according to the event information (S310).

According to an embodiment of the present disclosure, as described above, if the event may be an earthquake event for an earthquake, the control module 110c may transmit an evacuation guide command including location information of an evacuation site to the unmanned guide robot, so that the unmanned guide robot may notify earthquake occurrence and provide directions to the evacuation site at the same time.

According to an embodiment of the present disclosure, if the event may be a fire event, the control module 110c may transmit an evacuation guide command including location information of an evacuation site to the unmanned guide robot so that the unmanned guide robot notifies the occurrence of a fire and provides directions to the evacuation site at the same time, or transmit a firefighting command for suppressing a fire to the unmanned firefighting robot so that the unmanned firefighting robot may notify the fire and extinguish the fire at the same time.

According to an embodiment of the present disclosure, as described above, if the event may be a quality event for air quality, the control module 110c may transmit an evacuation guidance command including location information of an evacuation site to the unmanned guidance robot, thereby notifying air quality deterioration and at the same time and providing directions to the evacuation site.

According to an embodiment of the present disclosure, if the event may be a crime event for crime prevention or for a missing person, the control module 110c may transmit event information including a captured image and location information of an imaging point to a server of a related institution.

As described above, according to an embodiment of the present disclosure, by being in connection with the unmanned aircraft and the unmanned robot to monitor the management target area using the unmanned robot on the ground and monitoring the management target area using the unmanned aircraft from above, three-dimensionally monitoring about disasters, or the like such as fires occurring in the management target area may be performed.

In addition, according to an embodiment of the present disclosure, when an event such as a fire or earthquake occurs, an unmanned firefighting robot, an unmanned guide robot, and the like, may be introduced in at an early stage to quickly extinguish fire within a critical period, and help people to evacuate quickly.

Figure 4:
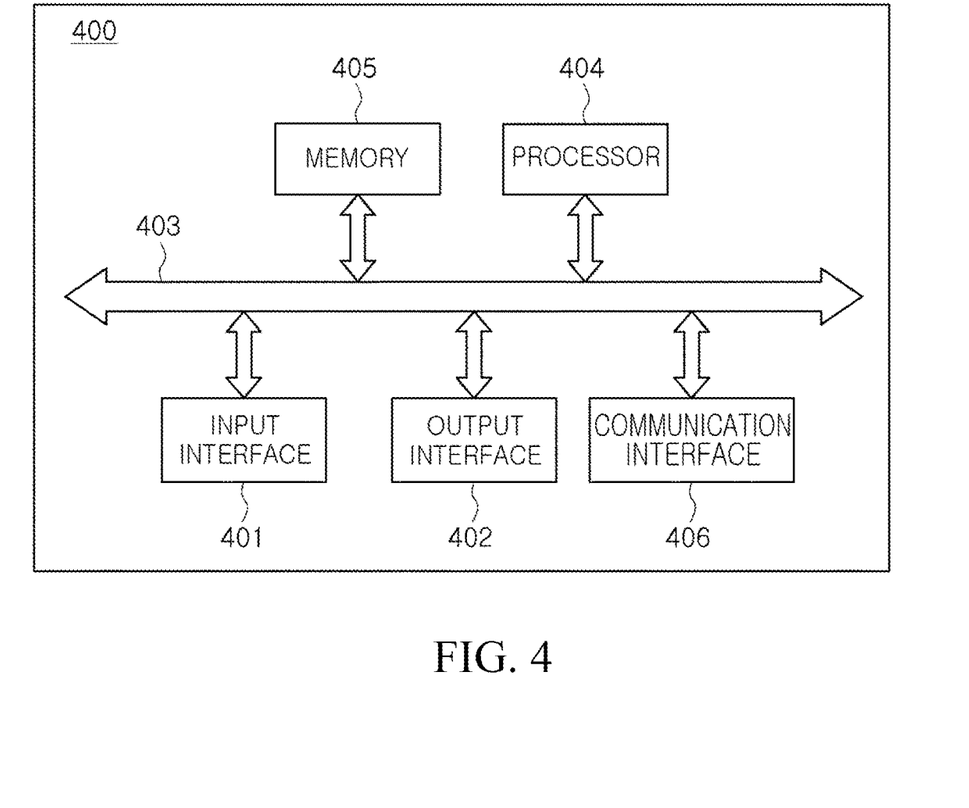
FIG. 4 is a block diagram of a computer device capable of fully or partially implementing a central management server, an unmanned robot, and an unmanned aircraft according to an exemplary embodiment of the present disclosure.

Meanwhile, FIG. 4 is a block diagram of a computer device that may fully or partially implement a central management server for monitoring a management target area according to an embodiment of the present disclosure, which may be applied to the central management server 110, the unmanned aircraft 120, the unmanned robot 130, or any combination thereof.

As illustrated in FIG. 4, the computer device 400 may include an input interface 401, an output interface 402, a processor 404, a memory 405 and a communication interface 406, and the input interface 401, the output interface 402, the processor 404, the memory 405, and the communication interface 406 may be interconnected via a system bus 403.

In an embodiment of the present disclosure, the memory 405 may be used to store a program, a command or a code, and the processor 404 may be configured to execute the program, the command or the code stored in the memory 405, control the input interface 401 to receive a signal, control the output interface 402 to transmit a signal. The above-described memory 405 may include read-only memory and random access memory, and may provide instructions and data to the processor 404.

In an embodiment of the present disclosure, it should be understood that the processor 404 may be a central processing unit (CPU), another general-purpose processor, a digital signal processor (DSP), an application specific integrated circuit (ASIC), a field programmable gate array (FPGA), or other programmable logic devices, a discrete gate or a transistor logic device, a discrete hardware component, or the like. The general purpose processor may be a microprocessor, or the processor may be any conventional processor, or the like.

In one implementation process, each method of FIG. 3 may be achieved by an integrated logic circuit of hardware or an instruction in a form of software in the processor 404. The content of the method disclosed in relation to the embodiment of the present disclosure may be implemented to be performed and completed by a hardware processor, or may be performed and completed by a combination of hardware and software modules of the processor. The software module may be disposed in a storage medium as known to persons skilled in the art, such as a random access memory, a flash memory, a read-only memory, a programmable read-only memory or an electrically erasable programmable memory, a register, and the like. The corresponding storage medium may be located in the memory 405, and the processor 404 reads information from the memory 405 and implements the contents of the above-described method in combination with hardware. In order to avoid duplication, detailed descriptions thereof may be omitted herein.

As set forth above, according to an exemplary embodiment of the present disclosure, by being in connection with an unmanned aircraft and an unmanned robot to monitor a management target area using an unmanned robot on the ground, and monitoring the management target area using the unmanned aircraft from above, three-dimensional monitoring of disasters such as fire, or the like, may be performed.

In addition, according to an embodiment of the present disclosure, when an event such as a fire, an earthquake, or the like, occurs, an unmanned firefighting robot, an unmanned guide robot, or the like, may be introduced in at an early stage to enable rapid fire suppression within a critical period, thereby helping people to evacuate quickly.

While the example embodiments have been illustrated and described above, it will be apparent to those skilled in the art that modifications and variations could be made without departing from the scope of the present disclosure as defined by the appended claims.

What is claimed is:

1. A system for monitoring a management target area in connection with an unmanned aircraft and an unmanned robot, comprising:
   the unmanned aircraft;
   the unmanned robot; and
   a central management server, comprising:
      a selection module configured to select the unmanned aircraft and the unmanned robot to monitor the management target area, and
      a control module configured to transmit a monitoring execution command to the unmanned aircraft and the unmanned robot selected by the selection module,
   wherein, according to the monitoring execution command, the unmanned robot is configured to move along a preset ground guard route and monitors the management target area on a ground, and the unmanned aircraft is configured to fly along a preset air guard route and monitor the management target area from above,
   wherein, at least one of the unmanned aircraft and the unmanned robot is configured to, based on determination that an event has occurred during monitoring, transmit event information including location information of a point at which the event has occurred to the control module,
   wherein, based on the management target area being greater than or equal to a preset first reference area, the selection module is configured to select a first unmanned aircraft having a first size as the unmanned aircraft, and
   wherein, based on the management target area being less than the preset first reference area, the selection module is configured to select a second unmanned aircraft having a second size smaller than the first size as the unmanned aircraft.

2. The system of claim 1, wherein the unmanned robot is configured to transmit the event information to the unmanned aircraft, wherein the unmanned aircraft receiving the event information from the unmanned robot is configured to monitor a point at which the event has occurred from above,
   wherein the unmanned aircraft is further configured to transmit the event information to the unmanned robot, wherein the unmanned robot receiving the event information from the unmanned aircraft is configured to monitor a point at which an event has occurred on the ground.

3. The system of claim 1, wherein the selection module is configured to select the unmanned aircraft and the unmanned robot based on a combination of topographical characteristics, area, and attributes of the management target area.

4. The system of claim 3,
   wherein, based on the management target area including an unpaved road, the selection module is configured to select, as the unmanned robot, a first unmanned robot moving using quadrels,
   wherein, based on the management target area including a paved road, the selection module is configured to select, as the unmanned robot, a second unmanned robot moving using wheels, and
   wherein, based on sky above the management target area being a no-fly zone, the selection module is configured to select only the unmanned robot in the management target area.

5. The system of claim 1, wherein the event comprises at least one of an earthquake event for an earthquake, a fire event for a fire, a quality event for air quality, a crime event for crime prevention or for a missing person, and an emergency event for an emergency situation.

6. The system of claim 5, wherein, when the event is an earthquake event for an earthquake,
   the unmanned robot is configured to measure intensity of the earthquake using an earthquake sensor, determine that the event has occurred when the measured intensity of the earthquake is greater than or equal to a preset earthquake intensity, and transmit event information including the measured earthquake intensity and location information of a measurement point to the control module,
   wherein the control module is configured to transmit an evacuation guidance command including location information of an evacuation site to an unmanned guidance robot, thereby notifying occurrence of the earthquake and providing directions to the evacuation site at the same time.

7. The system of claim 5, wherein, if the event is a fire event for a fire,
the unmanned aircraft or the unmanned robot is configured to image a fire site using a camera or measure heat generated from the fire site using a thermal sensor, and transmit event information including any one or more of the image and measured heat and location information of an imaging point to the control module, based on determination that the event has occurred based on any one of the image imaged by the camera and the heat measured by the thermal sensor,
wherein the control module is configured to transmit an evacuation guidance command including location information of an evacuation site to an unmanned guidance robot to notify the unmanned guidance robot of occurrence of the fire and provide directions to the evacuation site at the same time, or transmit a firefighting command for extinguishing a fire to an unmanned firefighting robot, to notify the unmanned firefighting robot of occurrence of a fire and extinguish the fire at the same time.

8. The system of claim 5, wherein, when the event is a quality event for air quality,
the unmanned aircraft or the unmanned robot is configured to measure a concentration of dust using an air quality sensor, or measure a concentration of gas generated in the management target area using a gas sensor, determine that the event has occurred when the measured concentration of the dust or the measured concentration of the gas is greater than or equal to a preset value for each thereof, and transmit event information including the measured concentration of the dust or the measured concentration of the gas and location information of a measurement point to the control module,
wherein the control module is configured to transmit an evacuation guidance command including location information of an evacuation site to an unmanned guidance robot to notify air quality deterioration and to provide directions to the evacuation site at the same time.

9. The system of claim 5, wherein, if the event is a crime event for crime prevention or for a missing person,
the unmanned robot images a face of a person in the management target area using a camera, determine that the event has occurred, when the face of the person imaged is different from a first face ID of a permitted person permitted to enter the management target area, or is the same as a second face ID of the missing person, and transmits event information including the image and location information of an imaging point to the control module,
wherein the control module is configured to transmit event information including the image and location information of an imaging point to a server of a related institution.

10. The system of claim 5, wherein, if the event is an emergency event for an emergency situation,
the unmanned aircraft or the unmanned robot is configured to image at least one person in the management target area using a camera, determine that the event has occurred when the number of the at least one person imaged is greater than or equal to a preset multiple of a normal number of people imaged based on a same location as the management target area, or a moving speed of the at least one person imaged is greater than or equal to a preset multiple of a normal moving speed imaged based on the same location, or when a movement route of the at least one person imaged is different from a normal movement route imaged based on the same location, and transmit event information including the image and location information of an imaging point to the control module,
wherein the control module is configured to transmit event information including the image and location information of an imaging point to a server of a related institution.

11. The system of claim 1, further comprising a plurality of the unmanned robots, wherein the management target area is divided into a plurality of divided areas, and each of the plurality of divided areas is monitored by a respective unmanned robot of the plurality of unmanned robots.

12. The system of claim 11, wherein each of the plurality of unmanned robots is further configured to transmit status information to the selection module in real time, the status information including at least a remaining battery capacity,
wherein the selection module is configured to set a size of each divided area of the plurality of divided areas to be monitored by each respective unmanned robot of the plurality of unmanned robots according to the remaining battery capacity.

13. A method for monitoring a management target area in connection with an unmanned aircraft and an unmanned robot, the method comprising:
selecting, by a selection module of a central management server, the unmanned aircraft and the unmanned robot to monitor the management target area,
transmitting, by a control module of the central management server, a monitoring execution command to the unmanned aircraft and the unmanned robot selected by the selection module,
according to the monitoring execution command:
by the unmanned robot, moving along a preset ground guard route and monitoring the management target area on a ground, and
by the unmanned aircraft flying along a preset air guard route and monitoring the management target area from above,
transmitting, by at least one of the unmanned aircraft and the unmanned robot based on determination that an event has occurred during monitoring, event information including location information of a point at which the event has occurred to the control module,
selecting, by the selection module based on the management target area being greater than or equal to a preset first reference area, a first unmanned aircraft having a first size as the unmanned aircraft, and
selecting, by the selection module based on the management target area being less than the preset first reference area, a second unmanned aircraft having a second size smaller than the first size as the unmanned aircraft.

14. The method of claim 13, further comprising:
selecting, by the selection module based on the management target area including an unpaved road, a first unmanned robot moving using quadrels as the unmanned robot,
selecting, by the selection module based on the management target area including a paved road, a second unmanned robot moving using wheels as the unmanned robot, and selecting, by the selection module based on sky above the management target area being a no-fly zone, only the unmanned robot in the management target area.

15. The method of claim 13, wherein, if the event is an earthquake event for an earthquake,
   measuring, by the unmanned robot intensity of an earthquake using an earthquake sensor,
   determine, by the unmanned robot, that the event has occurred when measured earthquake intensity is greater than or equal to a preset earthquake intensity, and
   transmit, by the unmanned robot of event information including the measured earthquake intensity and location information of the measurement point to the central management server.

16. The method of claim 13, wherein, if the event is a fire event for a fire,
   image, by the unmanned aircraft or the unmanned robot a fire site using a camera, or measure heat generated from the fire by using a thermal sensor,
   transmit, based on determination by the unmanned aircraft of the unmanned robot that the event has occurred based on any one of the image captured by the camera and heat measured by the thermal sensor, event information including any one or more of the image or the measured heat and location information of an imaged point to the central management server.

17. The method of claim 13, wherein, if the event is an air quality event for air quality,
   measure, by the unmanned aircraft or unmanned robot, a concentration of dust using an air quality sensor, or measure a concentration of a gas generated in the management target area using a gas sensor,
   when it is determined that the event has occurred based on the measured concentration of dust or the measured concentration of the gas, transmit, by the unmanned aircraft or unmanned robot, event information including the measured concentration of the dust and/or the measured concentration of the gas and location information of a measurement point to the central management server.

18. The method of claim 13, wherein, if the event is a crime event for crime prevention or for a missing person,
   image, by the unmanned robot, a face of a person in the management target area using a camera,
   when the face of the imaged person is different from a first face ID of a person permitted to enter the management target area or is the same as a second face ID of the missing person, determine by the unmanned robot, that the event has occurred, and transmit, by the unmanned robot, event information including the image and location information of an imaging point to the central management server.

19. The method of claim 13, wherein, if the event if an emergency event for an emergency situation,
   image, by the unmanned aircraft or unmanned robot, at least one person in the management target area using a camera,
   when a number of people of the at least one person imaged is greater than or equal to a preset multiple of a normal number of people imaged based on a same location of the management target area, a moving speed of the at least one person imaged is greater than or equal to a preset multiple of a normal moving speed imaged based on the same location, or a movement route of the at least one person imaged is different from a normal movement route imaged based on the same location, determine, by the unmanned aircraft or the unmanned robot, that the event has occurred, and transmit, by the unmanned aircraft or the unmanned robot, event information including the image and location information of an imaging point to the central management server.

20. A non-transitory computer-readable medium for monitoring a management target area in connection with an unmanned aircraft and an unmanned robot, comprising instructions stored thereon that, when executed on a processor, perform the steps of:
   selecting, by a selection module of a central management server, the unmanned aircraft and the unmanned robot to monitor the management target area,
   transmitting, by a control module of the central management server, a monitoring execution command to the unmanned aircraft and the unmanned robot selected by the selection module,
   according to the monitoring execution command:
      by the unmanned robot, moving along a preset ground guard route and monitoring the management target area on a ground, and
      by the unmanned aircraft flying along a preset air guard route and monitoring the management target area from above,
   transmitting, by at least one of the unmanned aircraft and the unmanned robot based on determination that an event has occurred during monitoring, event information including location information of a point at which the event has occurred to the control module,
   selecting, by the selection module based on the management target area being greater than or equal to a preset first reference area, a first unmanned aircraft having a first size as the unmanned aircraft, and
   selecting, by the selection module based on the management target area being less than the preset first reference area, a second unmanned aircraft having a second size smaller than the first size as the unmanned aircraft.

21. The non-transitory computer-readable medium of claim 20, comprising further instructions stored thereon that, when executed on a processor, perform the steps of:
   selecting, by the selection module based on the management target area including an unpaved road, a first unmanned robot moving using quadrels as the unmanned robot,
   selecting, by the selection module based on the management target area including a paved road, a second unmanned robot moving using wheels as the unmanned robot, and
   selecting, by the selection module based on sky above the management target area being a no-fly zone, only the unmanned robot in the management target area.

* * * * *